(12) United States Patent
Durand

(10) Patent No.: US 10,953,917 B2
(45) Date of Patent: Mar. 23, 2021

(54) STEERING TIE ROD WITH ELASTIC DAMPER PROTECTED UNDER THE STEERING BOX BOOT

(71) Applicant: JTEKT EUROPE, Irigny (FR)

(72) Inventor: Philippe Durand, Villeurbanne (FR)

(73) Assignee: JTEKT EUROPE, Irigny (FR)

( * ) Notice: Subject to any disclaimer, the term of this patent is extended or adjusted under 35 U.S.C. 154(b) by 8 days.

(21) Appl. No.: 16/333,425

(22) PCT Filed: Oct. 9, 2017

(86) PCT No.: PCT/FR2017/052760
§ 371 (c)(1),
(2) Date: Mar. 14, 2019

(87) PCT Pub. No.: WO2018/069616
PCT Pub. Date: Apr. 19, 2018

(65) Prior Publication Data
US 2019/0256137 A1    Aug. 22, 2019

(30) Foreign Application Priority Data

Oct. 11, 2016  (FR) ..................................... 16/59804

(51) Int. Cl.
*B62D 7/22* (2006.01)
*F16F 1/38* (2006.01)
*B62D 3/12* (2006.01)

(52) U.S. Cl.
CPC ............... *B62D 7/228* (2013.01); *F16F 1/38* (2013.01); *B62D 3/12* (2013.01); *F16F 2230/105* (2013.01)

(58) Field of Classification Search
CPC ...... B62D 7/228; F16F 1/38; F16F 2230/105; F16F 1/3842
See application file for complete search history.

(56) References Cited

U.S. PATENT DOCUMENTS 3,009,746 A * 11/1961 Haushalter ................ F16F 1/38
384/222
3,199,186 A * 8/1965 Simpson ................ B25B 27/28
29/450

(Continued)

FOREIGN PATENT DOCUMENTS

CA         2464162 A1 * 10/2004 ............. B62D 7/228
DE    198 43 726 A1    5/1999

(Continued)

OTHER PUBLICATIONS

Jan. 24, 2018 Search Report issued in International Patent Application No. PCT/FR2017/052760.

*Primary Examiner* — Karen Beck
(74) *Attorney, Agent, or Firm* — Oliff PLC

(57) ABSTRACT

A steering mechanism including a steering rack mounted with the ability to slide in a steering box connected to a steering tie rod which includes a rod connecting a first articulation member to a second articulation member intended to be connected to a steering knuckle, the mechanism also including an elastic sealing sleeve which delimits a fluidtight protective enclosure around the end of the rack, the rod of the steering tie rod being subdivided into an upstream rod portion, bearing the first articulation member, and a downstream rod portion distinct from the upstream rod portion and bearing the second articulation member, the upstream rod portion connected to the downstream rod portion by a joint includes an elastic damping member designed to damp relative movements of the downstream rod portion with respect to the upstream rod portion, and the joint being situated inside the protective enclosure delimited by the fluidtight sleeve.

10 Claims, 2 Drawing Sheets

(56) References Cited

U.S. PATENT DOCUMENTS

| | | | | |
|---|---|---|---|---|
| 5,062,654 A | * | 11/1991 | Kakimoto | B60G 7/02 |
| | | | | 267/141 |
| 2017/0267282 A1 | * | 9/2017 | Ogata | F16F 3/10 |
| 2020/0140010 A1 | * | 5/2020 | Ross | B62D 7/20 |

FOREIGN PATENT DOCUMENTS

| | | |
|---|---|---|
| EP | 0327347 A2 | 8/1989 |
| FR | 632 359 A | 1/1928 |
| GB | 2 050 271 B | 5/1983 |

* cited by examiner

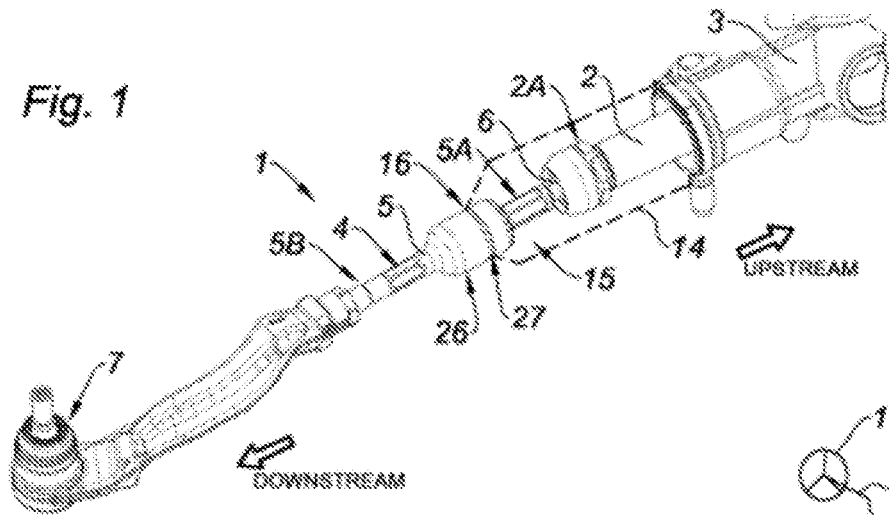
Fig. 1
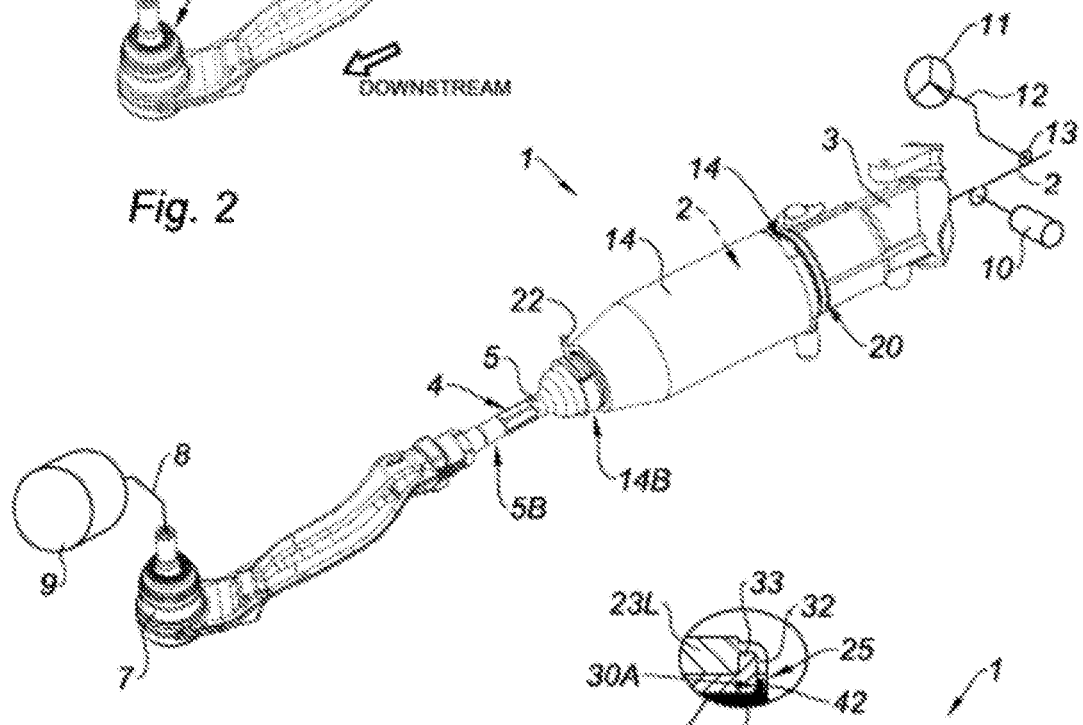
Fig. 2
Fig. 3
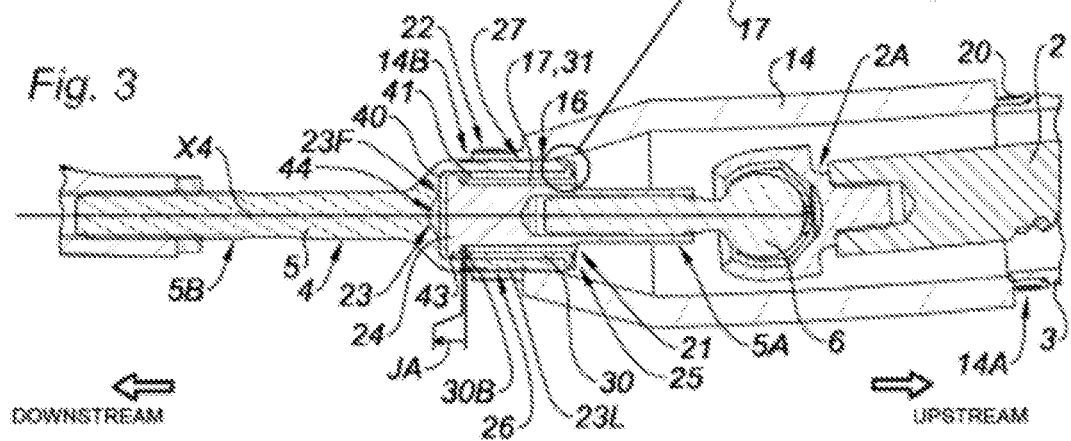

STEERING TIE ROD WITH ELASTIC DAMPER PROTECTED UNDER THE STEERING BOX BOOT

The present invention concerns steering mechanisms for vehicles, and more particularly the arrangement of tie rods which are used in such mechanisms in order to transmit a steering movement of the steering rack to the stub axles which carry the steered wheels.

It is known that the asperities of the roadway generate shocks and vibrations that tend to propagate by raising the kinematic chain of the steering mechanism from the wheels to the steering wheel, which is a source of discomfort for the driver.

This is why it is sometimes provided, within the steering mechanisms, elastomeric damping members which allow damping shocks and vibrations thus generated.

Moreover, the inventors have discovered that the presence of a suitably sized damping member could advantageously allow creating, when the driver maneuvers the steering wheel, a phase shift (a delay) between the orientation angle of the steered wheels and the angle of the steering wheel, a phase shift which has the consequence of increasing the steering radius of the vehicle, relative to what would be said steering radius if the wheels followed exactly and instantly the steering wheel angle, and thus decreasing the yaw rate of the vehicle, so that the vehicle is less likely to oversteer.

However, the implementation of such damping members tends to increase the size and weight of the steering mechanism, and exposes said mechanism to a higher risk of corrosion, to the extent that water or salt spray (that is to say salt water droplets suspended in the air, either naturally because the vehicle is at the seaside, or for example after snow-clearing the roadway by salting) can sometimes infiltrate between the metal parts that shelter said damping members.

The objects assigned to the invention consequently aim at overcoming the aforementioned drawbacks, and at proposing a new arrangement of the steering mechanism which ensures efficient mechanical filtering of shocks and vibrations caused by the asperities of the roadway, as well as an improvement in the vehicle dynamic behavior, in particular in yaw, while maintaining a certain compactness and good resistance to corrosion.

The objects assigned to the invention are achieved by means of a steering mechanism comprising a steering rack which is slidably mounted in a steering casing, said rack having an end which emerges from said steering casing and which is connected to a tie rod, said tie rod including a rod which links a first hinge member, such as a ball-joint sphere, connected to the rack, to a second hinge member intended to attach said tie rod to an effector member, such as a stub axle, said mechanism also comprising an elastic sealing sleeve which joins the steering casing to the tie rod so as to delimit an at least liquid water-tight protective enclosure, around the rack end, said mechanism being characterized in that the rod of the tie rod is subdivided into an upstream rod segment, carrying the first hinge member, and a downstream rod segment distinct from the upstream rod segment and carrying the second hinge member, in that the upstream rod segment is attached to the downstream rod segment by a junction which comprises an elastic damping member which is interposed between the upstream rod segment and the downstream rod segment so as to be able to damp relative displacements of the downstream rod segment relative to the upstream rod segment, and in that said junction is located inside the protective enclosure delimited by the sealing sleeve.

Advantageously, the elastic damping member interposed between the upstream rod segment and the downstream rod segment enables a certain relative mobility of the downstream rod segment relative to the upstream rod segment, and in particular reciprocating axial relative movements, while dissipating the energy of said relative movements, which allows, in particular, according to a first function, to damp shocks and vibrations coming from the road, and thus to prevent said shocks and vibrations from getting to the steering wheel, or else, according to a second function, to create a controlled phase shift between the maneuver of the steering wheel and the response in actual orientation of the steered wheels, so as to reduce the yaw rate, and thus make the behavior of the turning vehicle more progressive.

Furthermore, placing the junction between the upstream and downstream rod segments in the same protective enclosure as the open end of the steering casing and the end of the rack, sheltered under the sealing sleeve, which may preferably be a steering bellows, allows preserving said junction from any penetration at least of liquid water, and in particular salt spray, or dust, gravel or fluids present on board the vehicle, such as fuel, lubricant, brake liquid, etc.

Furthermore, placing the junction, and more particularly the damping member, as well as the sealing sleeve (steering bellows) which protects said junction, in a volume of the space which is already usually occupied by said sealing sleeve, allows not increasing, or at least not significantly increasing, the bulk of the steering mechanism.

Other objects, characteristics and advantages of the invention will appear in further detail upon reading the following description, as well as by using the appended drawings, provided for purely illustrative and non-limiting purposes, among which:

FIG. 1 illustrates, in a partial perspective view, a steering mechanism according to the invention, on which the sealing sleeve was removed to reveal the end of the rack as well as the junction between the upstream and downstream rod segments.

FIG. 2 illustrates, in a perspective view, the steering mechanism of FIG. 1 with the sealing sleeve put in place.

FIG. 3 illustrates, in a detail view in longitudinal section, the protective enclosure of the steering mechanism of FIGS. 1 and 2.

Figure 4:
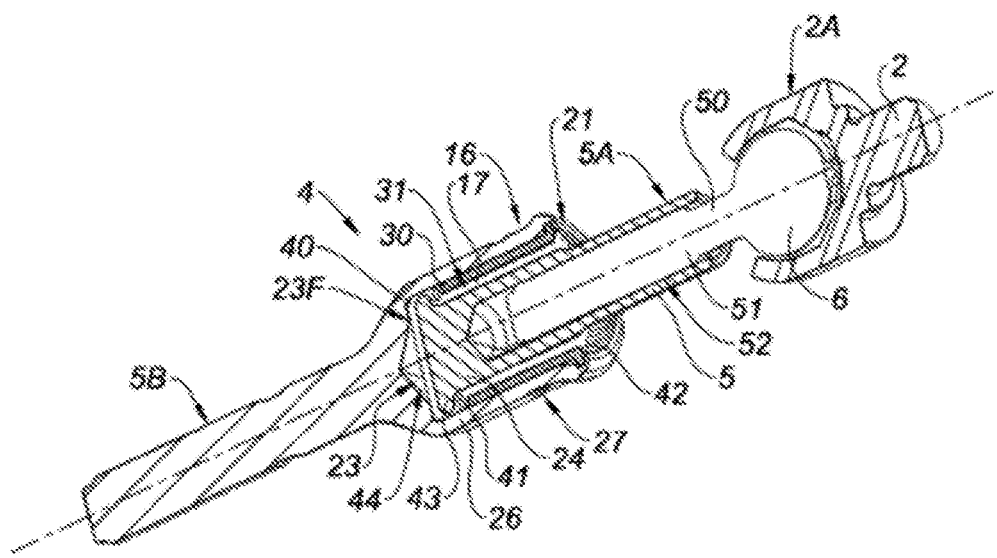
FIG. 4 illustrates, in a perspective view cut longitudinally, the detail of a tie rod of the mechanism of FIGS. 1 to 3.

The present invention concerns a steering mechanism 1 comprising a steering rack 2 which is slidably mounted in a steering casing 3.

Said rack 2 has an end 2A which emerges from said steering casing 3 and which is connected to a tie rod 4.

Said tie rod 4 includes a rod 5 which links a first hinge member 6, such as a ball-joint sphere 6, connected to the rack 2, to a second hinge member 7 intended to attach said tie rod 4 to an effector member 8, such as a stub axle 8.

Said stub axle 8 carries at least one steered wheel 9, as schematically shown in FIG. 2, so that when the rack 2 is displaced, it drives the tie rod 4 which in turn acts on the stub axle 8 in order to modify the yaw orientation of said wheel 9.

Preferably, and as schematically shown in FIG. 2, the steering mechanism 1 belongs to a power steering system, equipped with an assist motor 10, preferably an electrical assist motor, for example of the brushless type, said assist motor 10 being intended to produce an assist force which assists the driver to maneuver the steering mechanism 1, according to predetermined assist laws which are stored in a calculator which manages said steering system.

The steering mechanism 1 will also comprise, in a manner known per se, a steering wheel 11 which allows the driver to actuate said mechanism 1.

Preferably, to this end, said steering wheel 11 will be carried by a steering column 12 which engages the rack 2 by means of a drive pinion 13.

For convenience of description, it will be referred by X4 to the longitudinal axis (main axis) of the tie rod 4, and more particularly the longitudinal axis of the rod 5 of said tie rod 4, along which said tie rod 4 is biased in traction or in compression during maneuvers of the rack 2.

It will be referred then by «axial» to a direction or a dimension considered coaxial or parallel to said longitudinal axis X4, and by «radial» to a direction or a dimension considered perpendicular to said axis X4.

Moreover, as visible in FIGS. 2 and 3, the steering mechanism 1 also comprises an elastic sealing sleeve 14 which (axially) joins the steering casing 3 to the tie rod 4 so as to delimit an at least liquid water-tight protective enclosure 15, around the rack 2 end 2A, and more particularly around the first hinge member 6.

The sealing of the protective enclosure 15 will advantageously prevent any intrusion of liquid water into said protective enclosure 15, and in particular any intrusion of runoff water from the rain or projected by the wheels, or else any intrusion of salt spray.

More particularly, the protective enclosure 15 will be at least liquid water-tight, over a pressure range that extends at least from the atmospheric pressure to a pressure of 100 bars, or even more, in order to support high pressure cleaning.

Of course, the protective enclosure 15 will be even more solid particles-tight, said solid particles are of the gravel type, as well as liquid-tight, said liquids are other than water, likely to be in the outer environment of the steering mechanism 1, and which it is desired that they cannot penetrate into the protective enclosure 15, such as for example automotive liquids of the lubricant (oil), fuel, coolant, brake fluid, type.

Preferably, said sealing sleeve 14 is made of elastomeric material.

In a particularly preferred manner, the sealing sleeve 14 is formed by a bellows, preferably elastomeric bellows, and can therefore be assimilated to a bellows in the following.

Such a bellows shape will facilitate in particular the elastic deformations in axial compression, in axial extension, and in angular deflection (in flexion) of the sealing sleeve 14, which allow said sealing sleeve 14 to accommodate relative displacements of the end 2A of the rack and the tie rod 4 towards and away from the steering casing 3, regardless of the angular orientation of said tie rod 4 relative to the rack 2 and the steering casing 3.

According to the invention, the rod 5 of the tie rod 4 is subdivided into an upstream rod segment 5A, carrying the first hinge member 6, and a downstream rod segment 5B distinct from the upstream rod segment 5A and carrying the second hinge member 7.

The upstream rod segment 5A is attached to the downstream rod segment 5B by a junction 16 which comprises an elastic damping member 17 which is interposed between the upstream rod segment 5A and the downstream rod segment 5B so as to be able to damp relative displacements of the downstream rod segment 5B relative to the upstream rod segment 5A (and vice versa).

More particularly, the elastic damping member 17 will be arranged so as to be able to damp, by its elastic deformation, the axial relative displacements of the upstream rod segment 5A relative to the downstream rod segment 5B.

Said relative displacements may result for example from traction or compression axial forces exerted by the rack 2, and particularly by the steering wheel 11, during steering maneuvers, against the steered wheel 9, or else result from traction or compression forces which correspond to shocks or vibrations caused by the action of the roadway on the steered wheel 9.

Conventionally, it will be referred here by «upstream» to an element oriented towards the rack 2, the casing 3, and the steering wheel 11, and by «downstream» to an element oriented in the opposite direction, towards the stub axle 8 and the steered wheel 9.

The stiffness of the damping member 17 is advantageously selected lower than the Young's moduli of the upstream 5A and downstream 5B rod segments, so as to enable, on the one hand, an elastic relative mobility, in particular an axial elastic relative mobility, between said upstream 5A and downstream 5B rod segments, by elastic deformation of said damping member 17 in traction/compression, and on the other hand, a damping of axial oscillations in traction/compression.

According to the invention, the subdivision of the rod into an upstream segment 5A and a downstream segment 5B, and therefore the junction 16 comprising the damping member 17, is, as in particular visible in FIGS. 1, 3 and 4, distinct from the hinge members 6, 7, and located outside the hinge members 6, 7, at a distance from the latter. Particularly, said junction is considered distinct from and located outside the cages of the ball-joint links which link the rod 5 respectively to the rack 2 and to the stub axle 8. The junction 16 is located inside the protective enclosure 15 delimited by the sealing sleeve 14, as visible in FIGS. 1, 2 and 3.

The sealing sleeve 14 therefore forms an envelope which extends from the casing 3 on the one hand, to which said sealing sleeve 14 is fixed in an at least liquid water-tight manner, for example by means of a first constriction flange 20 of the elastic ring type, to downstream of the junction 16 on the other hand, and more particularly to downstream of the apparent separation line 21 of said junction 16.

It will be referred by «separation line 21» to the area where the physical separation appears between the upstream rod segment 5A and the downstream rod segment 5B.

In practice, said separation line 21 can thus be materialized by a visible segment of the damping member 17 sandwiched between the upstream rod segment 5A and the downstream rod segment 5B, as illustrated in FIGS. 3 and 4.

A second constriction flange 22, of the elastic ring type, allows clamping the sealing sleeve 14 in an at least liquid water-tight manner against the rod 5 of the tie rod 4, all around the longitudinal axis X4, as visible in FIGS. 2 and 3.

Advantageously, the envelope formed by the sealing sleeve 14 thus covers not only the end 2A of the rack, as well as a portion of the tie rod 4 including the first hinge member 6, but also the junction 16, and more particularly the separation line 21, and thus keeps all these elements sheltered in a same sealed protective enclosure which extends from the casing 3 to (at least) the downstream rod segment 5B of the tie rod 4.

The sealing sleeve 14 thus efficiently protects the junction 16, and more particularly the interface formed by the damping member 17 between the upstream rod segment 5A and the downstream rod segment 5B at the separation line 21 (at least) from moisture and water projections, without the need to provide specific sealing members at said separation line 21.

Preferably, the downstream rod segment 5B is provided with an accommodation housing 23, intended to receive the damping member 17 as well as a portion 24 of the upstream rod segment 5A, called «foot» 24, on which bears said damping member 17.

Figure 5:
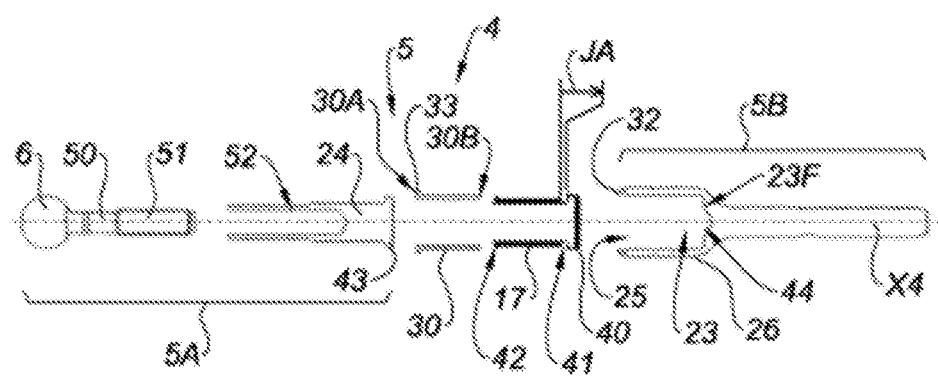
FIG. 5 illustrates, in an exploded view in longitudinal section, the tie rod of FIG. 4.

As in particular visible in FIGS. 3 to 5, and according to a preferred characteristic which may constitute an invention on its own, said accommodation housing 23 is formed by a blind hole which is axially pierced in the downstream rod segment 5B, which is radially delimited by a side wall 23L, and which has a passage opening 25 allowing the introduction of the damping member 17 and the foot 24 of the upstream rod segment 5A into said accommodation housing 23.

Preferably, to this end, the downstream rod segment 5B has a terminal bulge 26, preferably cylindrical and centered on the longitudinal axis X4, which is recessed to form the accommodation housing 23. Said bulge 26 thus forms a kind of junction case.

The side wall 23L is advantageously full, all around the longitudinal axis X4, and therefore water-tight, so that the only access to the accommodation housing 23, and therefore the only area potentially vulnerable to a water intrusion, is the passage opening 25.

According to a preferred characteristic which may constitute an invention on its own, and as this is in particular clearly visible in FIGS. 2 and 3, the sealing sleeve 14 can then engage the radially outer surface of the side wall 23L of the accommodation housing 23, while the passage opening 25 of said accommodation housing opens in the upstream direction, so as to be located inside the protective enclosure 15.

Thus, the separation line 21, which is in this case annular and centered on the longitudinal axis X4, is completely contained in the protective enclosure 15, inside the sealing sleeve 14, between, on the one hand a first upstream end 14A of said sealing sleeve which is sealingly attached to the casing 3, and on the other hand a second downstream end 14B of said sealing sleeve which is sealingly attached to the bulge 26 of the downstream rod segment 5B, downstream of the separation line 21, and which is therefore obstructed by said downstream rod segment 5B.

Advantageously, orienting the passage opening 25 in the upstream direction thus allows easily and efficiently protecting, inside the sealing sleeve 14, the junction 16, and more particularly the separation line 21, and therefore the access to the housing 23 and to the damping member 17, without the risk of having the sealing sleeve 14 accidentally uncover, in particular because of slippage or wear, said separation line 21.

It will be noted as such that the fact that the sealing sleeve 14 engages the full side wall 23 of the housing 23, by annular clamping of its downstream end 14B on the bulge 26, that is to say engages an enlarged diameter of the downstream rod segment 5B, advantageously provides a firm engagement of said sealing sleeve 14 on said downstream rod segment 5B.

This allows securing said sealing sleeve 14 to the downstream rod segment 5B and therefore avoiding in particular any friction and any wear of said sealing sleeve 14 against the junction 16.

Advantageously, and as this is clearly visible in FIG. 1, a groove 27 can be provided on the outer surface of the side wall 23L of the housing 23, on the perimeter of the bulge 26, in order to reinforce the axial anchoring of the sealing sleeve 14.

Moreover, it will be noted that the arrangement described above, according to which the downstream rod segment 5B preferably forms a female portion of the junction 16, while the upstream rod segment 5A forms the mating male portion of said junction 16, is particularly adapted for masking the junction 16 by the sealing sleeve 14, since it allows orienting the passage opening 25 and the separation line 21 in the upstream direction, according to a variant that will be called «upstream junction variant».

However, according to another variant, called «downstream junction variant», a reverse arrangement could be envisaged, with a female upstream rod segment 5A receiving a male downstream rod segment 5B, without departing from the scope of the invention.

According to such a downstream junction variant, it would be the upstream rod segment 5A, linked to the rack 2, which would form the female portion of the junction 16, while carrying the housing 23 and, where appropriate, the terminal bulge 26, while the downstream rod segment 5B, linked to the stub axle 8, would form the male portion (the foot 24), so that the junction 16, and more particularly the separation line 21 and the passage opening 25, would be oriented in the downstream direction (rather than in the upstream direction as in FIG. 3), downstream of the bulge 26.

In such a configuration, in order to ensure sealing the protective enclosure 15, the sealing sleeve 14 would be extended in the downstream direction, so as to engage the downstream rod segment 5B beyond the bulge 26 and beyond the junction 16 (in the downstream direction).

In absolute terms, each of the downstream junction or upstream junction variants, guarantees the protection of the junction 16, since it is always properly surrounded by the sealing sleeve 14, which axially overlaps said junction 16 so as to axially extend on either side of the latter (and more particularly on either side of the separation line 21), in the upstream direction as well as in the downstream direction.

However, the upstream junction variant will be preferred, which allows a more compact embodiment, with a shorter sleeve 14, and offers better resistance to wear and abrasion.

Moreover, the damping member 17 may take any appropriate shape.

Thus, for example, the damping member 17 could be formed by a hydraulic or pneumatic damper, and/or comprise, or even be formed by, a metal spring, such as an helical spring, in charge of elastically accommodating, over a predetermined displacement range, the relative displacements of the upstream rod segment 5A relative to the downstream rod segment 5B.

However, according to a preferred embodiment which is particularly simple, inexpensive and compact, the damping member 17 is made of elastomeric material, and particularly preferably formed integrally of elastomeric material, for example by overmolding.

The choice of an elastomeric block advantageously and inexpensively provides the required elastic deformability and damping properties.

Preferably, as illustrated in FIGS. 3, 4 and 5, the foot 24 of the upstream rod segment 5A is surrounded by a fixing bushing 30, preferably metal bushing, which nests into the accommodation housing 23 of the downstream rod segment 5B.

The damping member 17 can then advantageously be formed by an elastomeric damping sleeve which is overmolded around the foot 24, so as to bridge a filling space 31 provided to this end, in particular radially overmolded, between said foot 24 and said fixing bushing 30.

It will be noted that, according to this arrangement particularly compact and inexpensive to be implemented, the damping member 17 is thus on the one hand interposed, here at least radially interposed, between the foot 24 and the fixing bushing 30, and on the other hand maintained integrally between the foot 24 and the fixing bushing 30, not only radially maintained, but also axially maintained to ensure its function of axial damper.

The fixing bushing 30 is in turn preferably fixed by crimping into the accommodation housing 23, preferably by plastically folding an annular rim 32 of the side wall 23L of the accommodation housing 23 over a skirt 33 of said fixing bushing 30, as illustrated in FIG. 3.

Advantageously, such an assembly by nesting and crimping is particularly simple and inexpensive to be implemented.

Furthermore, it will be noted that the crimping is performed substantially over the perimeter of the passage opening 25, substantially along the separation line 21, so that the crimped area is contained in the protective enclosure, and consequently protected from water, dust, and corrosion, in particular without the need for providing an additional seal or a special treatment of the metal constituting the fixing bushing 30.

As such, it will be noted that such an arrangement further allows efficiently protecting from corrosion, within the protective enclosure 15, the area which is plastically deformed during crimping, and more particularly the annular rim 32 of the accommodation housing 23, and although, moreover, an optional anterior anti-corrosion treatment of the downstream rod segment 5B, and more particularly of the annular rim 32, for example a surface treatment, could have been deteriorated, and thus rendered inoperative, by the posterior crimping operation.

As illustrated in FIGS. 3, 4 and 5, the foot 24 of the upstream rod segment 5A has a collar 43.

Said collar 43 advantageously axially abuts, preferably via the damping member 17, on the one hand against the bottom 23F of the accommodation housing 23, when the rod 5 is biased in axial compression (that is to say when the upstream rod segment 5A is moved towards the downstream rod segment 5B, by axial compression, against the damping member 17), and on the other hand against an edge 30B of the fixing bushing 30, here a downstream edge 30B of said bushing, when the rod 5 is biased in axial traction (that is to say in the direction opposite to the previous direction, when the upstream rod segment 5A is axially moved away from the downstream rod segment 5B, against the damping member 17).

It will be referred by JA to the predetermined axial clearance which defines, between the foot 24 and the bushing 30, and more particularly between the collar 43 and the downstream edge 30B of the bushing 30, the authorized axial displacement range in traction.

Preferably, the damping sleeve (damping member) 17 has a mushroom shape comprising a head 40 which (at least axially) bears against the bottom 23F of the accommodation housing 23, opposite the passage opening 25, as well as a first stop skirt 41, which forms a first shoulder against which the downstream edge 30B of the fixing bushing 30 (axially) bears, and which is separated from the head 40 by the above-mentioned predetermined axial clearance JA.

Advantageously, when an axial compression is exerted on the rod 5, the foot 24 of the upstream rod segment 5A will elastically compress, and without shock, the downstream segment of the head 40 of the damping member 17 against the bottom 23F of the accommodation housing 23, while when an axial traction is exerted on the rod 5, the foot 24 will elastically compress the upstream segment of the head 40 of the damping member 17 against the bushing 30, and more particularly against the first stop skirt 41, which is interposed between the collar 23 and the downstream edge 30B of said bushing 30.

In order to facilitate elastic deformation of the damping member 17 during the compression of the rod 5, a release area 44, for example conical release area, can be provided in the bottom 23F of the housing 23, allowing the material constituting the damping member 17 to flow freely when it is driven by the foot 24 of the upstream rod segment 5A which presses said damping member against the bottom 23F.

It will be noted that the head 40 of the damping member 17 preferably has a radially protruding shoulder shape, which corresponds to the coating by the elastomeric material of the collar 43 of the foot 24.

Such a shape ensures, on the one hand, a good axial anchoring of the elastomeric material constituting the damping member 17 on the upstream rod segment 5A, and on the other hand, a precise adjustment of the axial clearance JA, the collar 43 being axially placed vis-à-vis the first skirt 41 and the corresponding downstream edge 30B of the fixing bushing 30.

It will be noted that, when forming the damping member 17, preferably by overmolding between the foot 24 and the bushing 30, it is possible to produce, other than the first (downstream) stop skirt 41, a second (upstream) stop skirt 42, which forms a second shoulder against which (axially) bears an upstream edge 30A of the fixing bushing 30, located axially opposite the downstream edge 30B.

For convenience of manufacture, the second skirt 42 of the damping member 17 will thus preferably be located at the passage opening 25, in order to constitute the apparent portion of the damping member 17, which marks the separation line 21 between the upstream rod segment 5A and the downstream rod segment 5B.

Advantageously, the first and second stop skirts 41, 42 can contribute to reinforcing the axial anchorage of the damping member 17 on the fixing bushing 30, and therefore more generally the (elastic) axial anchorage of said fixing bushing 30 on the upstream rod segment 5A.

Figure 6:
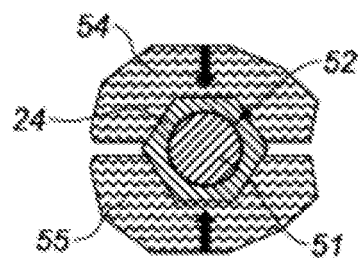
FIG. 6 illustrates, in a schematic cross-sectional view, the crimping operation allowing to secure two elements constituting the upstream rod segment by plastic deformation.

According to a preferred variant corresponding to FIGS. 3 to 5, the upstream rod segment 5A is formed by joining, on the one hand, a tip 50, which comprises the first hinge member 6 as well as a threaded shank 51, and on the other hand, a foot 24 intended to bear against, and preferably inside, the damping member 17 and which has a hole 52, here a smooth hole, in which the threaded shank 51 is engaged then immobilized by plastic deformation under pressing 54, 55 of said hole 52, as this is illustrated in FIG. 6.

Advantageously, it is thus possible to irreversibly secure the tip 50 with the foot 24, after axially placing said foot 24 relative to said tip 50 in the desired adjusted position, by radially crushing, by means of dies 54, 55, the tubular side wall of the hole 52 against the threaded shank 51.

Preferably, said dies 54, 55 will have a substantially hexagonal section so as to create a resulting hexagon profile on the apparent surface of the foot 24.

It will be noted that in order to manufacture the rod of the tie rod 5 according to the invention, it will therefore be advantageously possible:

- to prepare an «upstream subassembly» corresponding to the tip 50,
- to prepare a downstream rod segment 5B, with its housing 23,
- to form an «intermediate subassembly» comprising the foot 24, the damping member 17 and the fixing bushing 30, said damping member 17 preferably being overmoulded on said foot 24 and inside the bushing 30,
- then to form a «downstream subassembly» by nesting said intermediate subassembly into the accommodation housing 23 of the downstream rod segment 5B and by fixing the bushing 30 to said downstream rod segment 5B by plastically folding the annular rim 32 against the skirt 33,
- and finally, to fix the upstream subassembly (tip 50) to the downstream subassembly, preferably by crimping, so as to constitute the rod 5.

Of course, the invention also concerns as such a vehicle, and more particularly a motor vehicle, equipped with a steering mechanism 1 according to the invention.

Furthermore, the present invention is not limited to the variants described above, the one skilled in the art being able in particular to isolate or freely combine one or the other of the aforementioned characteristics, or to substitute it with an equivalent.

The invention claimed is:

1. A steering mechanism comprising
a steering rack which is slidably mounted in a steering casing, the rack having an end which emerges from the steering casing and which is connected to a tie rod, the tie rod including a rod which links a first hinge member, connected to the rack to a second hinge member intended to attach the tie rod to an effector member,
an elastic sealing sleeve which joins the steering casing to the tie rod so as to delimit an at least liquid water-tight protective enclosure, around the rack end, wherein
the rod of the tie rod is subdivided into an upstream rod segment, carrying the first hinge member, and a downstream rod segment distinct from the upstream rod segment and carrying the second hinge member,
the upstream rod segment is attached to the downstream rod segment by a junction which comprises an elastic damping member which is interposed between the upstream rod segment and the downstream rod segment so as to be able to damp relative displacements of the downstream rod segment relative to the upstream rod segment,
the junction is located inside the protective enclosure delimited by the sealing sleeve, and
the elastic damping member is a damping sleeve that has a blind hole that receives the upstream rod segment.

2. The mechanism according to claim 1, wherein the downstream rod segment is provided with an accommodation housing, intended to receive the damping member and a foot, which is a portion of the upstream rod segment on which the damping member bears, the accommodation housing is formed by a blind hole which is axially pierced in the downstream rod segment which is radially delimited by a side wall, and which has a passage opening allowing the introduction of the damping member and the foot of the upstream rod segment into the accommodation housing, the sealing sleeve engages the radially outer surface of the side wall of the accommodation housing, and the passage opening of the accommodation housing opens in the upstream direction, so as to be located inside the protective enclosure.

3. The mechanism according to claim 1, wherein the damping member is made of elastomeric material.

4. The mechanism according to claim 2 wherein the foot of the upstream rod segment is surrounded by a fixing bushing, which nests into the accommodation housing of the downstream rod segment, and the damping sleeve is overmolded around the foot, so as to bridge a filling space provided to an end between the foot and the fixing bushing.

5. The mechanism according to claim 4 wherein the fixing bushing is fixed by crimping into the accommodation housing.

6. The mechanism according to claim 4 wherein the damping sleeve has a mushroom shape comprising a head which bears against the bottom of the accommodation housing, opposite the passage opening, and a first stop skirt, which forms a first shoulder against which the downstream edge of the fixing bushing bears, and which is separated from the head by a predetermined axial clearance.

7. The mechanism according to claim 1 wherein the upstream rod segment is formed by joining a tip, which comprises the first hinge member and a threaded shank, and a foot to bear against the damping member and which has a hole, in which the threaded shank is engaged and immobilized by plastic deformation under pressing of the hole.

8. The mechanism according to claim 1 wherein the sealing sleeve comprises a bellows shape.

9. A vehicle equipped with a steering mechanism according to claim 1.

10. A steering mechanism comprising
a steering rack which is slidably mounted in a steering casing, the rack having an end which emerges from the steering casing and which is connected to a tie rod, the tie rod including a rod which links a first hinge member, connected to the rack to a second hinge member intended to attach the tie rod to an effector member,
an elastic sealing sleeve which joins the steering casing to the tie rod so as to delimit an at least liquid water-tight protective enclosure, around the rack end,
wherein the rod of the tie rod is subdivided into an upstream rod segment, carrying the first hinge member, and a downstream rod segment distinct from the upstream rod segment and carrying the second hinge member, the upstream rod segment is attached to the downstream rod segment by a junction which comprises an elastic damping member which is interposed between the upstream rod segment and the downstream rod segment so as to be able to damp relative displacements of the downstream rod segment relative to the upstream rod segment, and the junction is located inside the protective enclosure delimited by the sealing sleeve,
wherein the downstream rod segment is provided with an accommodation housing, intended to receive the damping member as well as a foot, which is a portion of the upstream rod segment on which the damping member bears, the accommodation housing is formed by a blind hole which is axially pierced in the downstream rod segment which is radially delimited by a side wall, and which has a passage opening allowing the introduction of the damping member and the foot of the upstream rod segment into the accommodation housing, the sealing sleeve engages the radially outer surface of the side wall of the accommodation housing, and the passage opening of the accommodation housing opens in the upstream direction, so as to be located inside the protective enclosure, wherein the foot of the upstream rod segment is surrounded by a fixing bushing, which nests into the accommodation housing of the downstream rod segment, and the damping member is formed by an elastomeric damping sleeve which is overmolded around the foot, so as to bridge a filling space provided to this end between the foot and the fixing bushing, wherein the damping sleeve has a mushroom shape comprising a head which bears against the bottom of the accommodation housing, opposite the passage opening, as well as a first stop skirt, which forms a first shoulder against which the downstream edge of the fixing bushing bears, and which is separated from the head by a predetermined axial clearance.

\* \* \* \* \*